United States Patent [19]

Murray

[11] Patent Number: 4,706,109
[45] Date of Patent: Nov. 10, 1987

[54] TELEVISION TRANSMISSION SYSTEM

[75] Inventor: Bruce Murray, Slough, England

[73] Assignee: U.S. Philips Corporation, New York, N.Y.

[21] Appl. No.: 739,333

[22] Filed: May 30, 1985

[30] Foreign Application Priority Data

Jun. 8, 1984 [GB] United Kingdom ............... 8414665

[51] Int. Cl.$^4$ ............................................. H04N 7/20
[52] U.S. Cl. ....................................... 358/12; 358/13
[58] Field of Search ....................... 370/68, 99, 110.1;
358/11, 12, 13, 142, 146, 147

[56] References Cited

U.S. PATENT DOCUMENTS 3,213,201 10/1965 Flood ..................................... 370/68
4,545,052 10/1985 Steierman ............................ 370/99

OTHER PUBLICATIONS

PCM Toll Swiching Networks Using Partial Access Pulse Shifters, Saito, et al., Elec. and Comm. in Japan, vol. 59A, No. 7, 1976, pp. 53-62.

Primary Examiner—Michael A. Masinick
Attorney, Agent, or Firm—Thomas A. Briody; William J. Streeter; Gregory P. Gadson

[57] ABSTRACT

In television transmitter equipment for a television transmission system having a time multiplexed signal in component form, the vision components are derived from a vision source (1), encoded in a MAC encoder (2) and the encoded vision signals are modulated in a frequency modulator (3) which also receives oscillations from an oscillator (4). The modulated output of the frequency modulator (3) is applied through a multiplexer (5) to a transmitter (6) whose modulated carrier is applied to a dish aerial (7) for transmission to a satellite. The equipment contains a number of sources (8 to 15) of sound/data information which are separated into two groups, an 'A' group of sources (8 to 11) and a 'B' group of sources (12 to 15). Digital signals from the 'A' group sources are applied to an 'A' packet multiplexer (17) where the signals are assembled packet-by-packet into a given time area at a bit rate of 10.125 MHz. Corresponding signals from the 'B' group sources are applied to a 'B' packet multiplexer (18) where these signals are similarly assembled into a corresponding time area at the same bit rate. The outputs of the 'A' and 'B' packet multiplexers (17, 18) are applied to respective inputs of a further multiplexer (19) to produce within the time area bits derived from the two packet multiplexers. This data, the appropriate line sync words from a sync word generator (21) and data from a source (23) for lines 624 and 625 of each frame are assembled in a data assembler (20) to produce the data burst containing the sound-/data components for the time multiplexed signal. This is modulated in a 2-4 PSK modulator (22) and the modulated output applied to a further input of the multiplexer (5). The data burst of the signal produced may be readily separated into its two groups to produce a data burst at the lower bit rate from one group for the transmission of a time multiplexed television signal over a medium of narrow bandwidth such as a cable channel.

6 Claims, 11 Drawing Figures

FIG. 4

TELEVISION TRANSMISSION SYSTEM

BACKGROUND OF THE INVENTION

The invention relates to a television transmission system having a time multiplexed signal in component form, the majority of the lines of a frame period of which contain a digital data burst component and a vision component, the data in the burst component, which is derived from a plurality of sources, being time multiplexed as a series of blocks from each source in the data burst which has a given data rate. The invention also relates to such a system for use over a medium of restricted bandwidth and also to equipment for use with such a system.

Such a data transmission system has been proposed for use with the broadcasting of television signals from satellites where the sound and other data (apart from the main vision components) are to be broadcast in digital form.

Following the decision in March 1982 that direct broadcast by satellite (DBS) of television programs for the United Kingdom would commence in 1982 an Advisory Panel chaired by Sir Anthony Part was established to report on technical transmission standards. The findings of this Panel published in November 1982 by Her Majesty's Stationery Office as Cmnd 8751 "Direct Broadcasting by Satellite—Report of the Advisory Panel on Technical Transmission Standards" (known as the Part Report) recommended that the Independent Broadcast Authority's Multiplexed Analogue Component (C-MAC) system should be adopted for DBS, which recommendation has subsequently been accepted.

The C-MAC system has been described in the Independent Broadcast Authority's Experimental and Development Report 118/82 "MAC—A Television System for High-Quality Satellite Broadcasting" dated August 1982, this report also describing the A-MAC system (the prefix relating to the type of sound and other data transmission). Proposed specifications were included in this report for the two systems, that for the C-MAC system having been revised since the adoption of that system for DBS. The changes in the structure of the video waveform include a reduction in transition periods following the sound/data, chrominance and luminance components with a consequent lengthening of the sound/data component.

FIG. 1 of the accompanying drawings (which is not to scale) diagrammatically shows one line period of a C-MAC television signal which occupies 64 $\mu$s and each line is divided notionally into a number of bit or sample periods at a clock rate of 20.25 MHz, there being 1296 such samples per line. FIG. 1 is derived from FIG. 1 on page 11 of the European Broadcasting Union (EBU) Draft New Report "Television Standards for 625-line 12 GHz Satellite Broadcasting", SPB 284, dated June 1983, the entire contents of which is incorporated herein by way of reference. Each line contains the following in the sequence given— a=203 bits—synchronization, sound/data (data burst)
b=4 samples—transition from end of data
c=15 samples—main clamp period (zero-level of chrominance reference)
SC1=6 samples—reserved for vision scrambling.
d=354 samples—chrominance (C)
g=704 samples—luminance (Y)
SC2=6 samples—reserved for vision scrambling.
h=4 samples—transition into data.

The chrominance component is time compressed by 3:1 so that approximately 52 $\mu$s of chrominance information is compressed to occupy 17.48 $\mu$s (354 samples) with the R-Y color difference signal being transmitted on alternate lines and the B-Y color difference signal being transmitted on the intervening lines. The luminance component is time compressed by 3:2 so that approximately 52 $\mu$s of luminance information is compressed to occupy 34.76 $\mu$s (710 samples). For DBS transmissions the compressed chrominance and luminance components are frequency modulated with a bandwidth of 27 MHz while the radio frequency carrier is modulated using 2-4 phase shift keying (2-4 PSK) by the digital sound/data component. The current proposal is that the sound/data component shall be packet multiplexed and located in 624 lines of each television frame, each packet comprising 751 bits made up from the 195 bits available in each line for the 624 lines (the first 8 bits of each data burst comprising 1 bit for data run-in followed by 7 bits forming a line sync word). This is shown in FIG. 2 which is derived from FIG. 2 of the above mentioned EBU Report, a packet occupying approximately 3.85 of the 195 bit data periods of each television line while the whole of line 625 is arranged to carry data as explained in this EBU Report. In FIG. 2:
S—is the line sync word
L1 to L625—are the line numbers of the data burst
V—is the area occupied by the vision signal
P1 to P162—are the packets, and
L625D—is the data in line 625

While it will be possible for households to directly receive the DBS transmission by means of a dish aerial of appropriate size sighted onto the satellite, with a down-converter at the aerial to bring the frequency of the incoming transmission to just above the broadcast U.H.F. bands, it has also been suggested that many households will prefer to receive such transmission via a cable television distribution system which at the same time can convey other television programs while doing away with the need for individual aerials. Such distribution by way of cable will obviously have advantages where the signal from the satellite is weak e.g., the transmission is not primarily intended for the country in which it is received, where transmissions are being received from a number of satellites located in different geostationary positions thus requiring a complex aerial array, or in areas of high occupancy where the sighting of aerials may be difficult.

Chapter 7 of the Part Report deals with the interaction between DBS and cable distribution systems and it is reported that the Cable Television Association of Great Britain considered it would be able to provide a cable service even if C-MAC was chosen as the DBS transmission standard. Several examples are given in that chapter, and where appropriate to C-MAC, the inference is that this type of signal could be directly transmitted over cable systems. Present cable which transmission systems use co-axial cable convey their television programs in the V.H.F broadcast bands, and while there is much debate at present as to whether future installed systems should use optical fiber cables, it is quite likely that many of the systems yet to be installed will also be co-axial cable in view of lower installation cost.

It has recently been realized that the transmission of a C-MAC signal over a VHF cable transmission system is not as feasible as originally thought, as the 27 MHz bandwidth of such a signal would occupy too much bandwidth, thus reducing the number of programs that such a cable system could carry, and there is also opposition especially in Continental Europe to extending the channel spacing of the cable channels which at present stands at 7 MHz. In addition, transmission of the sound/data component at the high 20.25 Mbit/s rate would pose severe problems on such cable systems because of the short delay reflections produced, and there is therefore a much lower bit rate limit for such cable systems. With the above in mind, early suggestions were that the only practical way of handling such a signal over a VHF cable transmission system would be to convert the C-MAC signal into a PAL type signal prior to its application to a cable system. Such a conversion would lose the advantage of time multiplexed chrominance and luminance and re-introduce the defects of cross-luminance and cross-color present with color subcarrier systems but more important where the received DBS signal is scrambled to prevent unauthorized reception e.g. subscription television services, it would be necessary to descramble the signal prior to conversion and then rescramble the converted signal.

In our co-pending United Kingdom Patent Application No. 8306921 (PHB 32963) we proposed to overcome the above problem by amplitude modulating the vision component (compressed chrominance and compressed luminance) and by expanding the data burst (the digital sound/data component) such that it had a lower bit rate so that it can then modulate a separate carrier. While this proposal substantially reduces the bandwidth requirements it still needs a bandwidth of about 14 MHz which is virtually the bandwidth of two channels and which has not found favor with cable operators wishing to contain such a DBS signal within a single channel.

It has subsequently been appreciated that the vision components for a MAC system if subsequently amplitude modulated can be bandwith limited to conveniently lie within the 7 MHz channel spacing available to European cable operators and still produce after decompression a television picture which is at least as good as displays produced from transmitted PAL television signals while not suffering from the cross color and cross luminance defects of such PAL signals. However, this still presents a problem with the sound/data components especially if they are not to be used to modulate a separate carrier for reasons of bandwidth but have to be retained time multiplexed in the data burst period of the MAC signal. One suggestion for cable operation by the German Post Office has been to remodulate all the sound/data components as a quaternery signal still retaining the bit rate of 20.25 Mbits per second but which effectively consists of symbols at a 10.125 MHz rate where each symbol is one of four levels and carries two bits of information. However, this proposal has been found to be very sensitive to reflection in a cable, to be difficult to recover the clock frequency from and the signal has both small vertical and horizontal eyes. A further suggestion has been to halve the bit rate such that it is 10.125 Mbits per second which has shown itself to be acceptable for transmission over cable when used with duo-binary coding (a three level signal where there is intentional inter-symbol interference) where it can be accommodated in a bandwidth of 5.0625 MHz. This would result in only half the sound/data components being conveyed as compared with the C MAC Packet system proposed in the above EBU Report. The above systems and the advantages and problems surrounding them are discussed in the report MDD/RDT/007/84/MA of Centre Commun d'Études de Télédiffusion et Télécommunications (CCETT) "Le Codage MAC/Duobinaire—Adaptation du Signal C-MAC—Paquets aux Reseaux Terrestres" by M. Alard and R. Lassalle, dated 19th Jan. 1984.

A further disadvantage of reducing the number of components that can be transmitted at the reduced bit rate of 10.125 Mbits per second (say eight sound/data sources in the C-MAC Packet proposal at 20.25 Mbits per second but only four such sources at half that bit rate) is that the cable operator on receiving the C-MAC signal has to select the four sources he requires for transmission over cable and with the manner proposed in the above EBU document for assembling the packets from the various sources, the only practical way of achieving this would be to de-multiplex the sound/data sources of the C-MAC signal, to store these de-multiplexed components, to select the four sources primarily required to accompany the vision signal, and then to re-multiplex the selected sources prior to their transmission over a cable.

SUMMARY OF THE INVENTION

It is an object of the invention to provide a transmission system with which the above disadvantage can be avoided.

The invention provides a television transmission system having a time multiplexed signal in component form, the majority of the lines of a frame period of which contain a digital data burst component and a vision component, the data in the data burst component, which is derived from a plurality of sources, being time multiplexed as a series of blocks from each source in the data burst which has a given data rate, characterized in that said sources are divided into a number of groups and the data from the sources for each group is time multiplexed as a series of blocks of bits from each source in a data bit stream to form a corresponding number of sub-multiplexes, the data bits forming each of the relevant lines of the data burst being derived from each of the said number of data bit streams at the said given data bit rate with the number of bits in a data burst corresponding to an integral multiple of the said number of groups.

The above system allows the data from the various groups to be readily derived from the data burst so that for a particular application, namely when reforming the television signal for transmission over a medium of restricted bandwidth, the data from that group may be used alone with the reformed television signal.

The sources may be divided in to two groups, successive lines of each data burst always starting with a bit from a first of said two groups.

The invention also provides television transmitter equipment for use with the above television transmission system comprising a source of vision signals to form a time multiplexed vision signal, a plurality of sources of sound/data signals, means for processing the sound/data signals as digital signals and for time multiplexing the digital signals as a series of blocks located in the data burst component of said television signal at a given data rate, characterized in that said sources of sound/data signals are divided into a number of groups, means for time multiplexing the signals from the sources of each group as a series of blocks of bits in a data bit stream to form a corresponding number of sub-multiplexes, means for selecting the bits from each of the said number of bit streams and for assembling said bits into said data burst such that the relevant lines of the data burst contain bits derived from each of the bit streams at the said given data rate, the number of bits in a data burst corresponding to an integral multiple of the said number of groups.

When the sources of sound/data signals are divided into two groups, the selecting means may select the bits from each goup such that successive lines of each data burst start with a bit from a first of said two groups.

The invention further provides television receiving equipment for use with the above television transmission system comprising means for receiving said television signal, means for separating said vision components from said television signal, means for producing the data burst from said television signal, characterized in that said receiving equipment additionally comprises means for selecting the bits from the data burst representing a particular one of said groups.

Such equipment may additionally comprise means for re-modulating said vision components on a carrier with a bandwidth less than that of said received signal, while means may be further provided for forming said bits from said one of said groups into a reformed data burst with a reduced data rate corresponding to the said given bit rate divided by the said number of sub-multiplexes, and means for modulating the data burst so formed onto said carrier to form a further time multiplexed television signal comprising said bandwidth restricted vision components and the reformed data burst.

BRIEF DESCRIPTION OF THE DRAWINGS

The above and other features of the invention will now be briefly described by way of example with reference to the accompanying drawings, FIGS. 1 and 2 being briefly described supra, FIGS. 4, 5, 6, 7A and 7B are timing diagrams for explaining the operation of the transmitter equipment of FIG. 3.

DETAILED DESCRIPTION OF THE INVENTION

Figure 1:
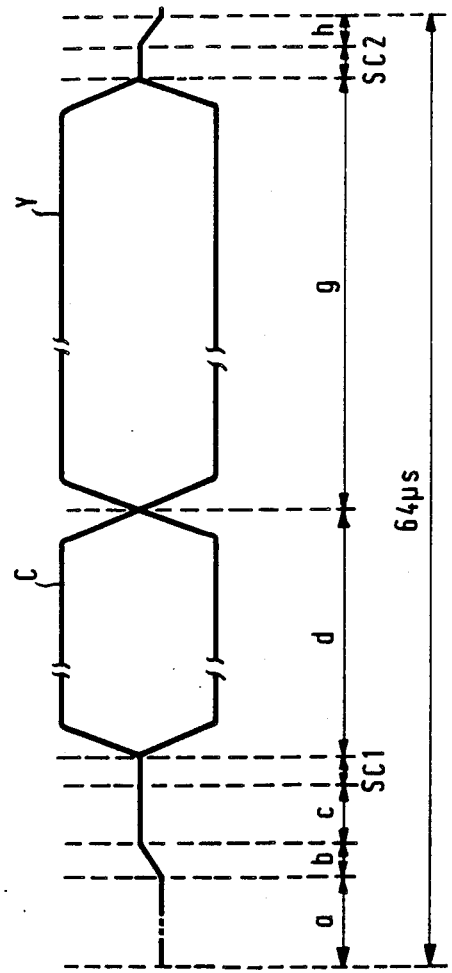
Figure 3:
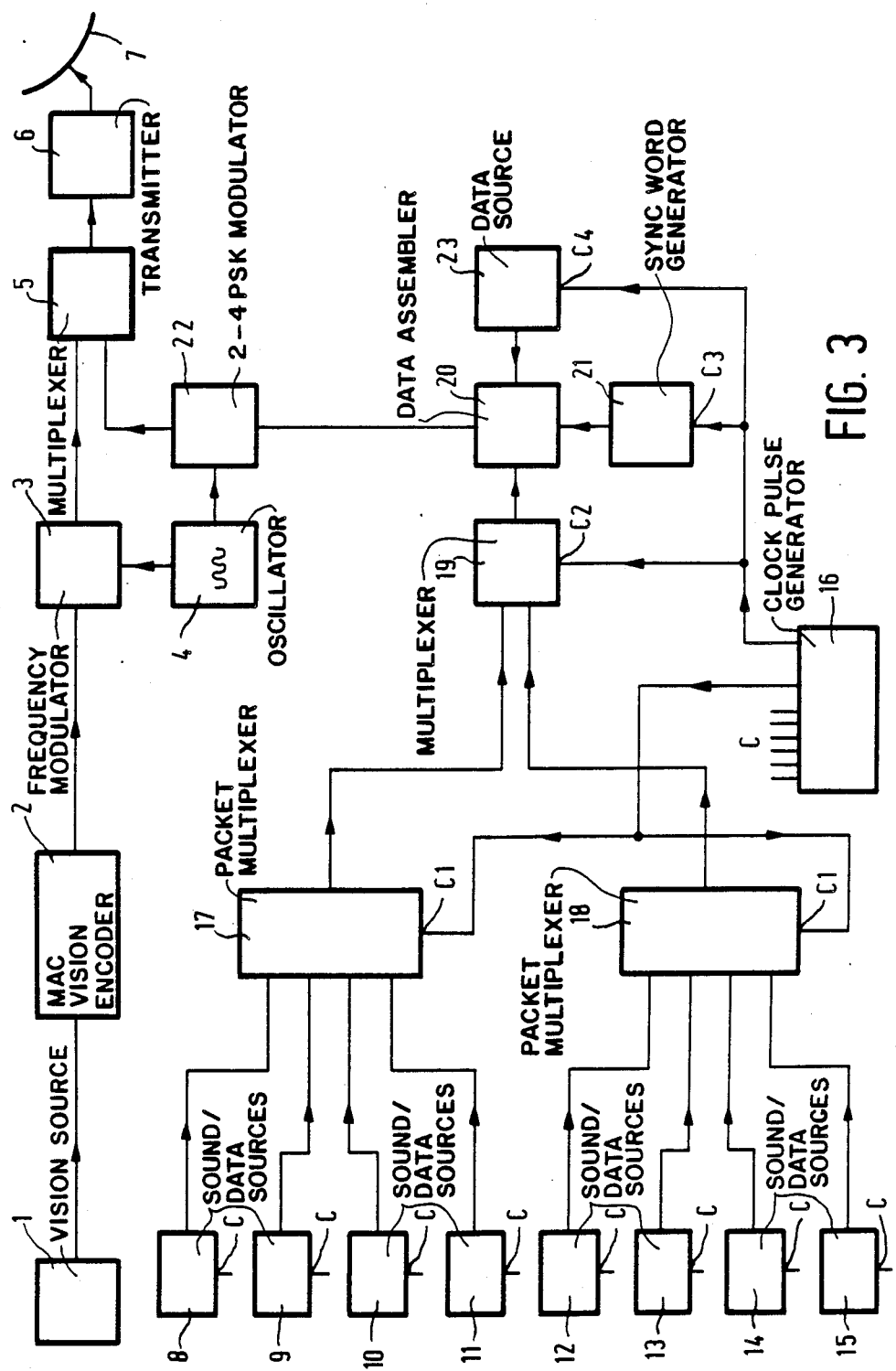
FIG. 3 is a block diagram of transmitter equipment for use with the present invention.

The block diagram of FIG. 3 shows transmitter equipment for generating one form of the time multiplexed television signal according to the invention. The vision components of the transmission equipment are supplied by a vision source 1 and applied to a MAC vision encoder 2 where the luminance and color difference signals from the source 1 are compressed at their required rates and assembled time-wise as shown in FIG. 1. It will be assumed that the MAC vision component from the encoder 2 is not subject to scrambling but if it were to be scrambled this would also take place in the encoder 2 by any one of the known techniques which have recently received considerable discussion. The multiplexed vision component from the encoder 2 is applied to a frequency modulator 3 to which oscillations at the appropriate frequency are applied from an oscillator 4 such that that signal transmitted occupies a bandwidth of 27 MHz at the required transmission frequency. The modulated output from modulator 3 is applied to a multiplexer 5 whose output is applied through a transmitter 6 to a dish aerial 7 for directing the transmitted signal to the appropriate satellite. The construction and operation of the vision signal generation equipment is relatively well-known and will not be described further.

Figure 2:
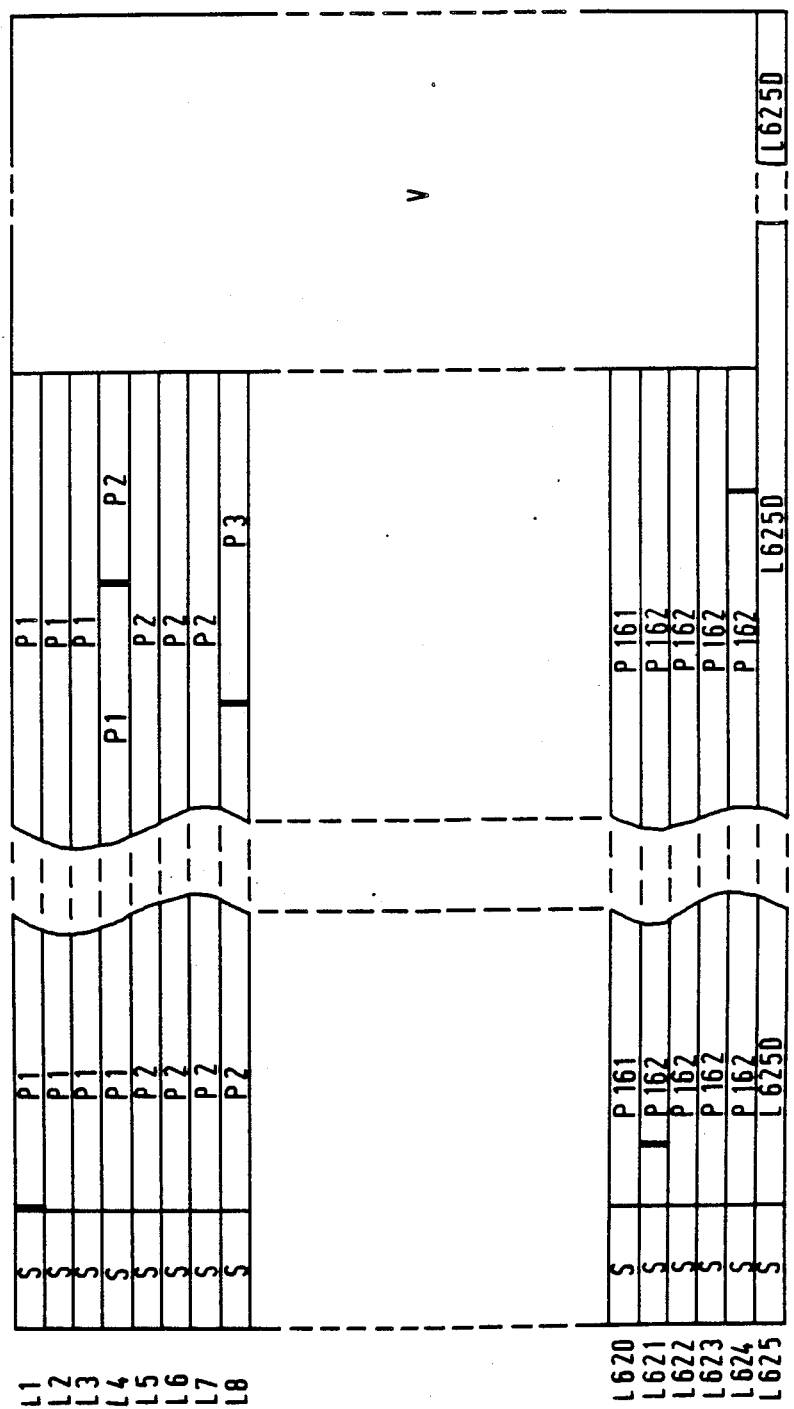
Figure 4:
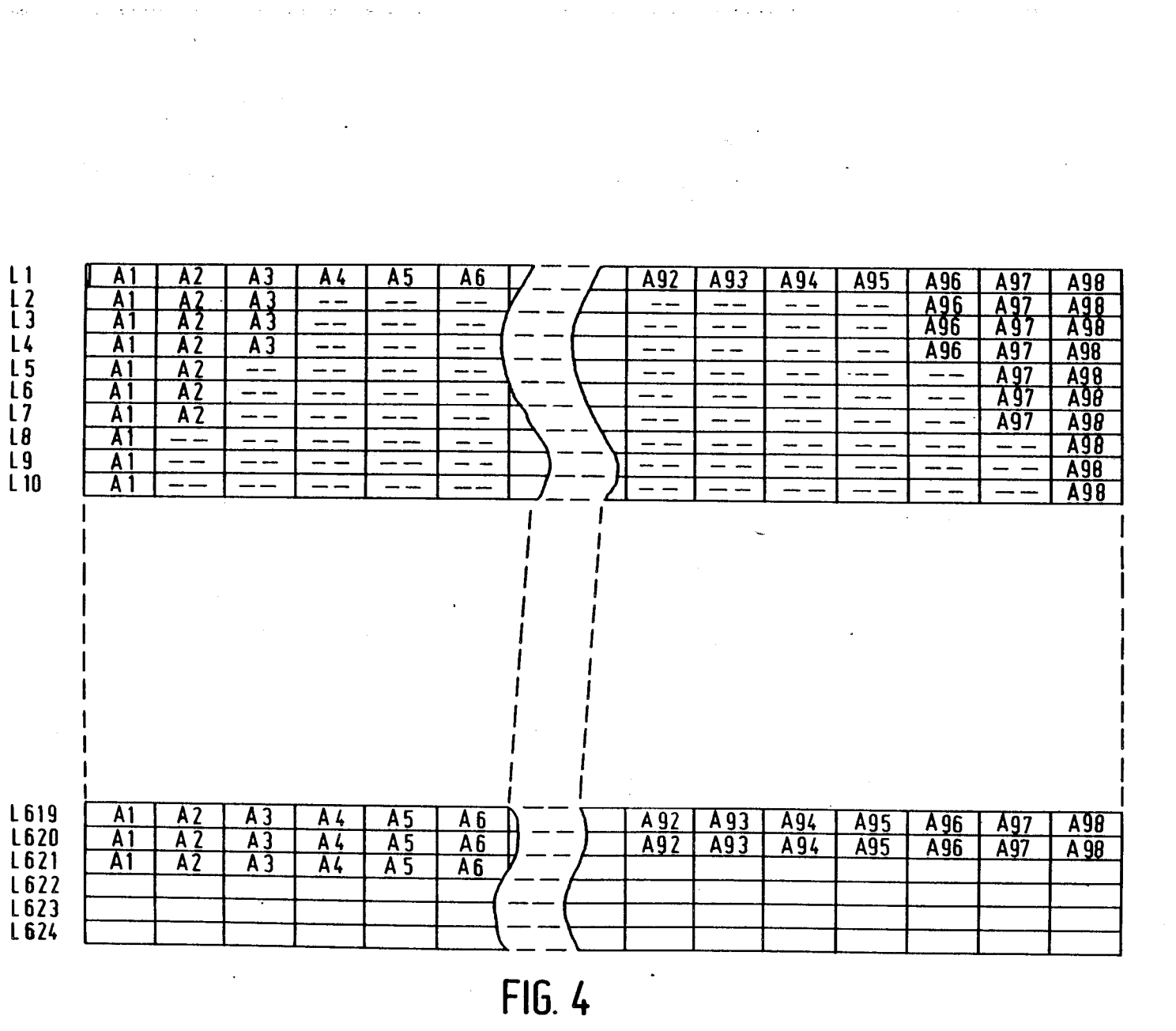
Figure 5:
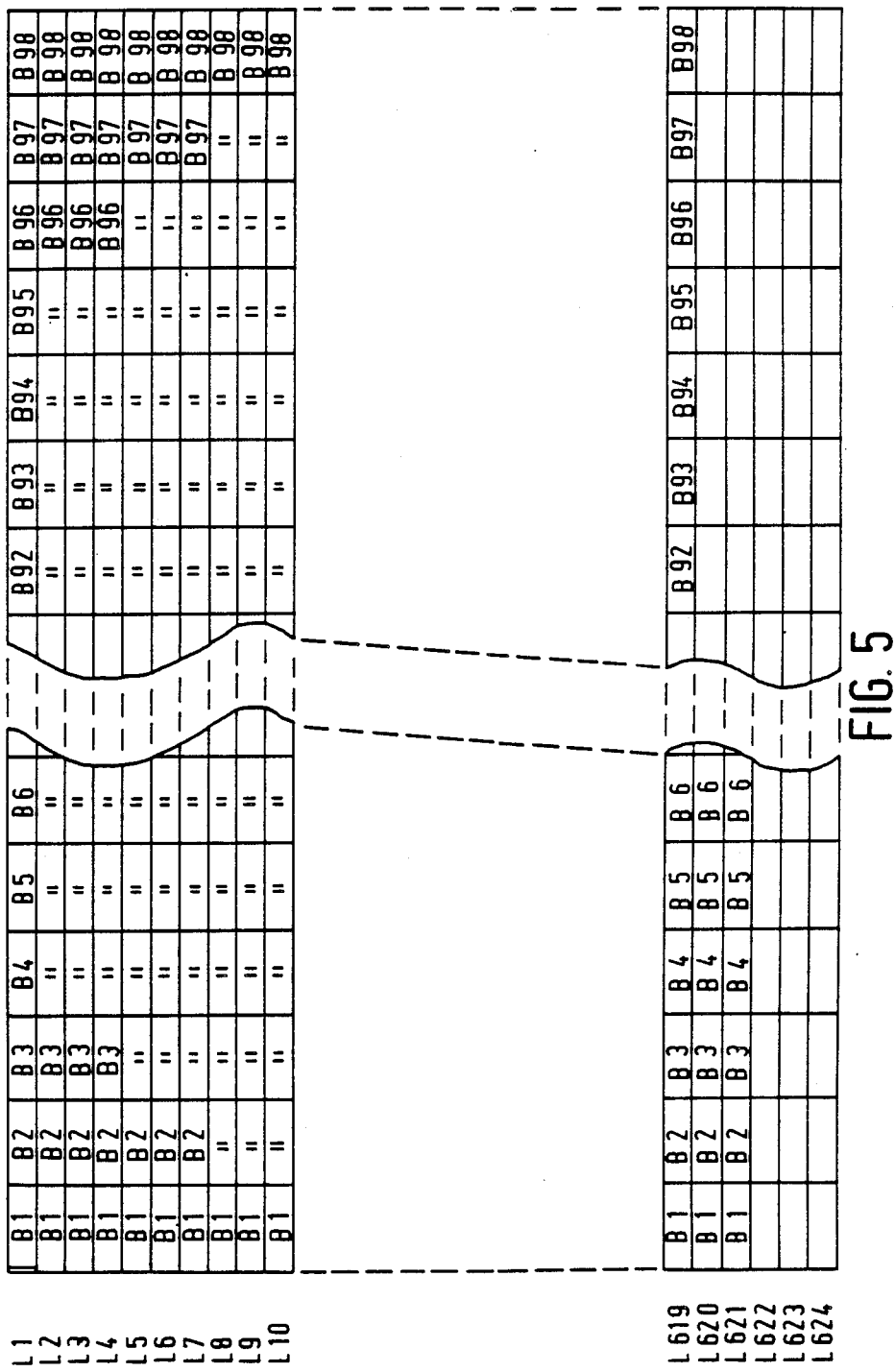

The transmitter also includes eight sound/data sources numbered 8-15 inclusive and which may in turn, include a pair of sources providing stereo sound signals associated with the vision signal, further sources providing other stereo or mono-aural sound signals, data in the form of teletext signals and data representing the over-air authorization for the vision and some of the other signals. In the present description it will be assumed that the sources 8 and 9 provide the two sound signals for the stereo sound signal associated with the vision signal, source 10 provides a teletext signal which may be used for sub-titling the vision signal while source 11 provides the above-mentioned over-air authorization, these four sources forming a first group 'A'. Each of the sources 8-15 inclusive has a input terminal C for receiving from an appropriate output of a clock pulse generator 16 a clock signal of a frequency appropriate to the nature of the source. The outputs from the sources 8-11 inclusive are applied to respective inputs of an 'A' or first packet multiplexer 17 while the outputs of the remaining source 12-15 which form a second group 'B' are applied to inputs of a 'B' or second packet multiplexer 18. Each of the packet multiplexers 17 and 18 has a clock input C1 for receiving clock pulses at the rate of 10.125 MHz from an output of the clock pulse generator 16. The 'A' packet multiplexer 17 takes the incoming digital signals from the sources 8-11 and assembles these signals into packets in a known manner with appropriate headers at the rate of 10.125 Mbits/s, the assembly of these packets being into a time region or area similar to that occupied by the data burst in the C-MAC Packet signal proposed in the above EBU Report. FIG. 4 shows diagrammatically the above time area containing the sub-multiplex from the output of the 'A' packet multiplexer 17 which, at the bit rate of 10.125 Mbits/s contains 98 bits in each line portion, and if each packet contains the prescribed 751 bits then each packet will occupy approximately 7.66 such line portions, FIG. 4 corresponding to a portion of FIG. 2. The above bits are shown in FIG. 4 with each bit in a line portion being indicated by A with a numbered bit suffix while the start of a packet on line L1 (which ends during line L8) is indicated by a doubled boundary line. Sub-multiplex 'A' will then contain 81 such packets per frame while in addition there will be 321 spare bits starting towards the end of line 621 and extending through lines 622, 623 and 624. Therefore, the bit rate and number of packets per sub-multiplex will be half that specified in the above EBU Report. The signals from the sources 12-15 will be processed in an identical manner by the 'B' packet multiplexer 18 with the number of bits per line again being 98, each 751 bit packet also occupying approximately 7.66 line portions. In such a case the sub-multiplex 'B' will also contain 81 packets per frame with the same number of spare bits appearing in lines 621, 622, 623 and 624 as for sub-multiplex 'A'. The sub-multiplex 'B' is shown diagrammatically in FIG. 5 which is numbered in a corresponding manner with FIG. 4.

Figure 6:
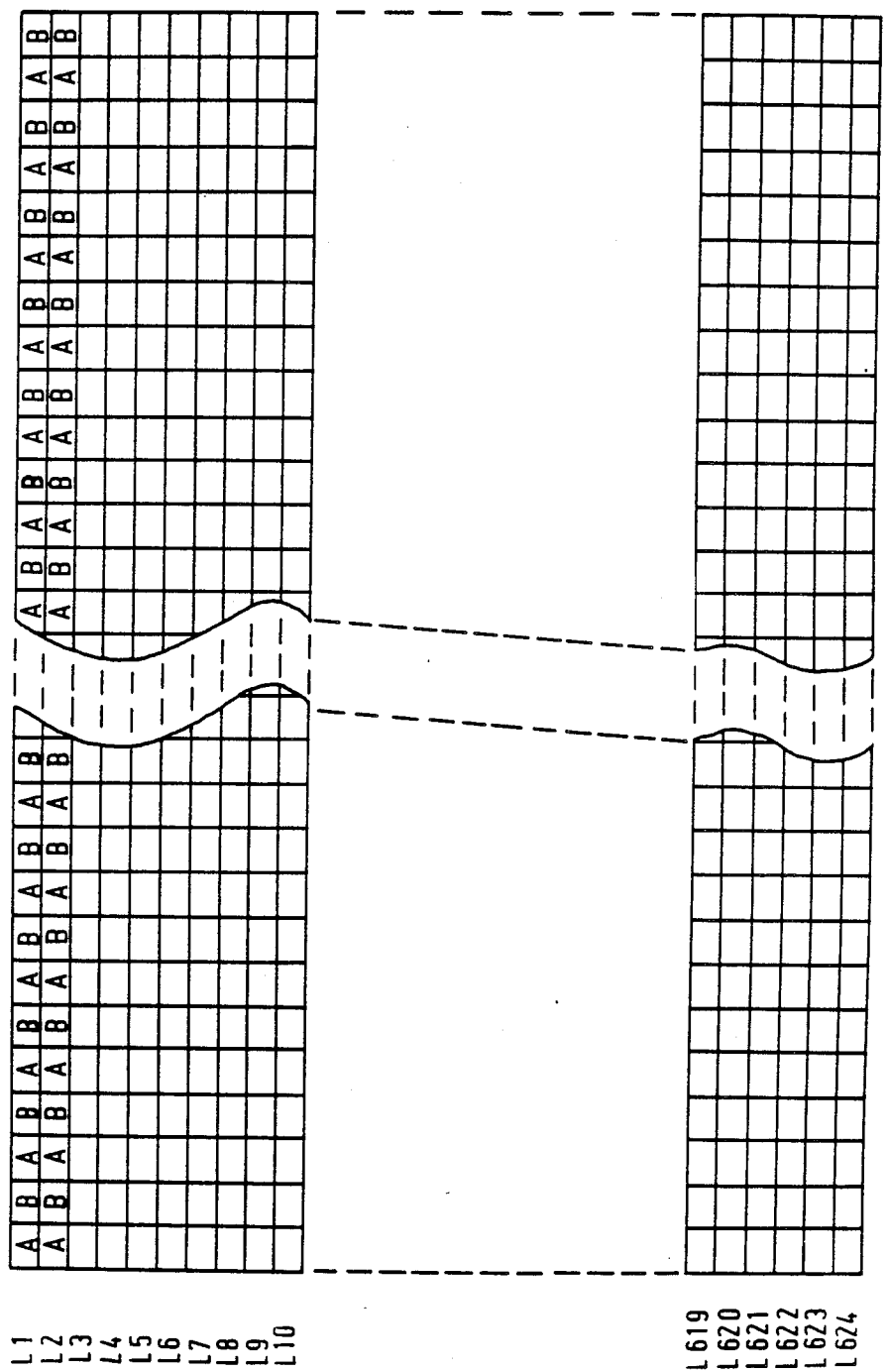

The 'A' and 'B' sub-multiplexes from the 'A' and 'B' packet multiplexers 17 and 18 are applied to respective inputs of a multiplexer 19 also having a clock input C2 which receives clock pulses at 20.25 MHz from a further output of clock pulse generator 6. The multiplexer 19 is arranged to convey bits at the 20.25 MHz rate from the 'A' and 'B' sub-multiplexes of the 'A' and 'B' packet multiplexers 17 and 18 such that the multiplex so formed has the prescribed bit rate of 20.25 Mbits/s with its bits drawn from the two groups ('A' and 'B') of the sound/data sources 8 to 15. The output from the multiplexer 19 is applied to a first input of a data assembler 20 which may be in the form of a further multiplexer, a second input of which is connected to the output of a sync word generator 21 having a clock input C3 which receives clock pulses at 20.25 MHz from the further output of the pulse generator 16, the sync word generator 21 producing the 8 bits which in the assembled data frame precedes on each line the sound/data bits and which comprises the one bit of run-in and the appropriate 7 bit line sync word. The third input of the data assembler 20 is connected to a source 23 for the data which is to appear in line 625 as prescribed in the above EBU Report (or lines 624 and 625 if modified as described below) and which also has a clock input C4 for receiving clock pulses at 20.25 MHz from the further output of the clock pulse generator 16. The output of the data assembler 20 contains during lines 1 to 625 the data frame for the C-MAC Packet signal and FIG. 6 shows the assembly of the data bits in a data frame which deviates from that proposed in the above EBU Report in that each bit of the active data is alternately obtained from two groups of sources with each active data portion of each line containing 196 bits instead of the previously proposed 195 bits, but contains the line sync word in prescribed form and either line 625 data information in that form or modified lines 624 and 625. This output is applied to the data input of a 2-4 PSK modulator 22 a further input of which receives oscillations from the oscillator 4 to produce a phase shift keyed signal which is applied to the second input of the multiplexer 5 such that this modulated data is introduced into the C-MAC packet signal during the appropriate time intervals. From FIG. 6 it will be seen that the sound/data bits on each line always start with an 'A' group source and end with a 'B' group source such that each line contains 98 'A' bits and 98 'B' bits.

With the active data period per line being increased from 195 to 196 bits the number of bits or samples in the remaining portion of the line will need to be changed if each line period still contains 1296 sample periods. It is therefore proposed that the number of sample periods for the vision components be slightly reduced and the transition periods be slightly increased. The table relating to FIG. 1 would then be modified as follows:

a = 204 bits—synchronization, sound/data (data burst)
b = 5 samples—transition from end of data
c = 15 samples—main clamp period (zero-level of chrominance reference)
SC1 = 5 samples—reserved for vision scrambling.
d = 352 samples—chrominance (C)
g = 704 samples—luminance (Y)
SC2 = 6 samples—reserved for vision scrambling.
h = 5 samples—transition into data.

Figure 7A:
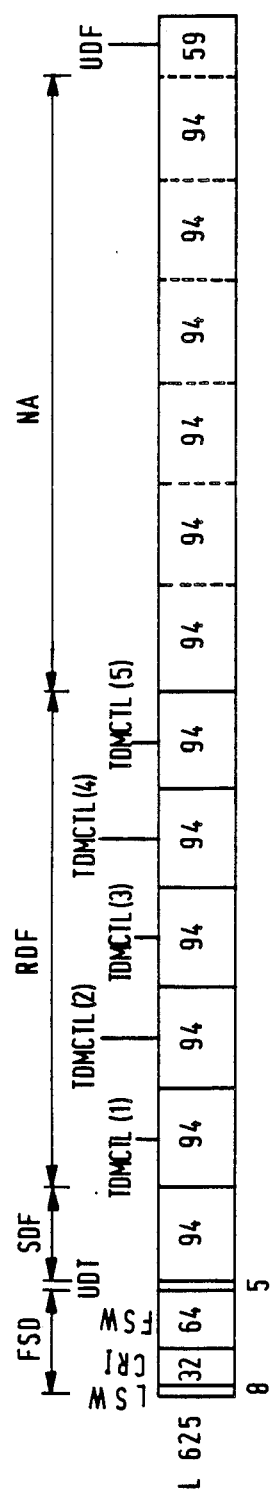
Figure 7B:
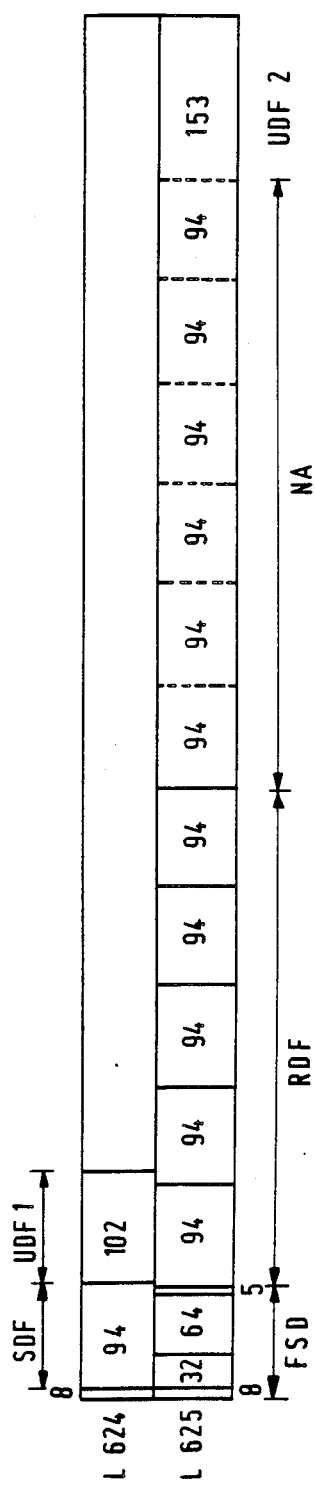

As has been previously stated the whole of line 625 in the above EBU document is allocated to carry data and FIG. 7a shows the structure of this line where:
FSD = 104 bits—frame synchronizing data
UDT = 5 bits—unified date and time
SDF = 94 bits—static data frame
RDF = 470 bits—repeated data frame comprising five 94 bit data blocks TDMCTL (1) to (5)-time division multiplex control groups
NA = 564 bits—six 94 bit data blocks not allocated
UDF = 59 bits—undefined The frame synchronizing data (FSD) contains:
LSW = 8 bits—1 bit demodulator run-in plus 7 bits line synchronization word
CRI = 32 bits—clock run-in
FSW = 64 bits—frame synchronization word In order to allow the required data from line 625 to be accommodated at a cable head end converter in a line period but at half bit rate it is further proposed to modify lines 624 and 625 as shown in FIG. 7b. As with the present system the active data period of line 624 does not carry sound/data from sources 8–15 it is proposed that this period conveys the static data frame (SDF) leaving 102 bits undefined (UDF1) in that data period. Line 625 is modified by not carrying the static data frame (SDF) but continues to carry the other information, the undefined period (UDF2) at the end of line 625 being increased to 153 bits. The reason for the changes will be explained hereinafter.

Figure 8:
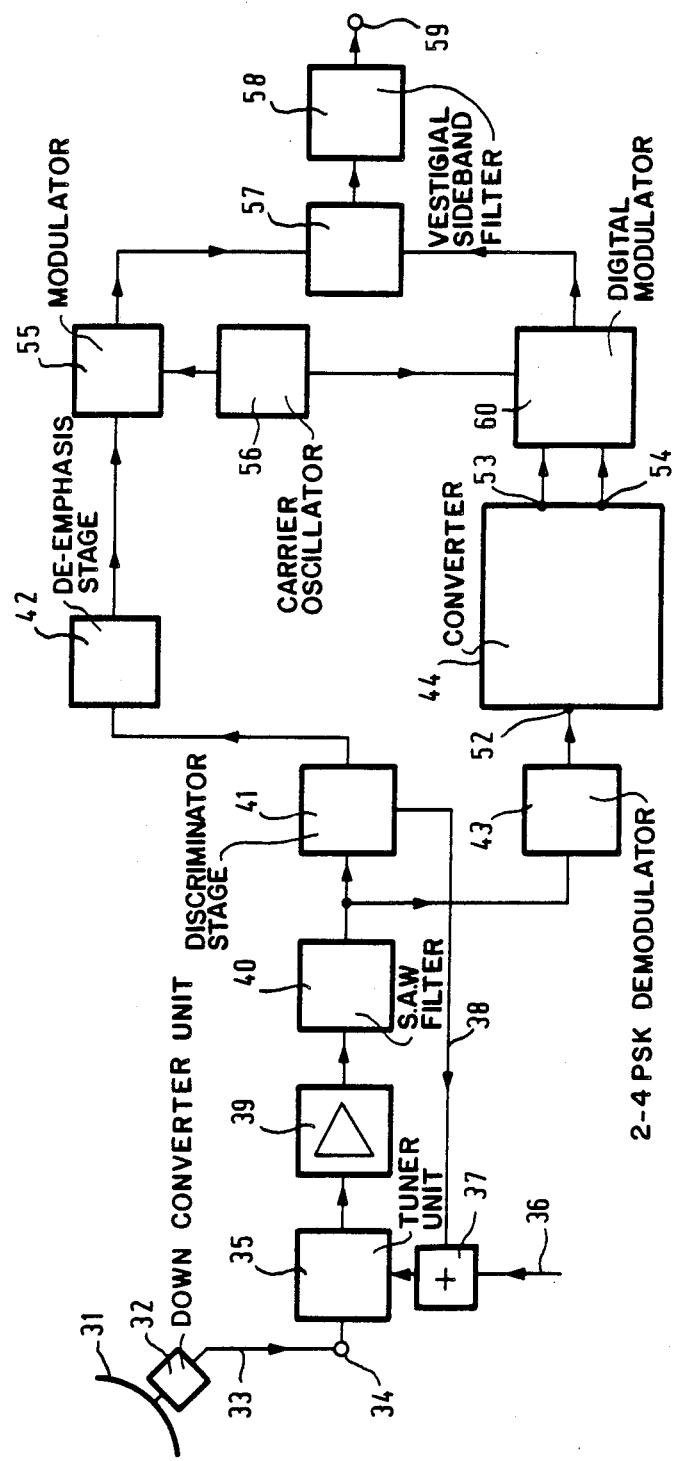
FIG. 8 is a block diagram of a receiver and converter for use with the present invention.

The block diagram of FIG. 8 shows a receiver which includes a converter for converting a received C-MAC DBS television signal of the above-described type into one suitable for application to a cable distribution system. This Figure shows a dish aerial 31 of appropriate dimensions for receiving C MAC Packet DBS television signals which are located in the 12 GHz broadcasting band. Attached to the aerial 31 is a down converter unit 32 in which the frequencies of the incoming signals are shifted such that they are positioned just above the UHF broadcasting bands and lie between 950 and 1750 MHz, so that they can be readily applied via a co-axial cable 33 to an input terminal 34 of the receiver. In the receiver the signals at terminal 34 are applied to a tuner unit 35 where the required television signal is selected in the usual manner by mixing it with a tuned local oscillator signal to produce an intermediate frequency (i.f.) signal which in this case has a frequency of 134 MHz. The bandwidth of the tuner and the resulting i.f. signal is 27 MHz to match the bandwith of the DBS signal. Tuning in the tuner unit 35 is by means of a selection voltage applied over a connection 36 from a selector unit (not shown) applied by way of a first input of an adder circuit 37 whose output is connected to the the appropriate input of the tuner unit 35. The adder circuit 37 has a second input to which an automatic frequency control (a.f.c.) voltage is applied over a connection 38, this a.f.c. voltage being added to the selection voltage to ensure correct tuning of the tuner unit 35. The i.f. signal from the tuner unit 35 is amplified in an amplifier stage 39 and applied to surface accoustic wave (S.A.W.) filter 40 having a pass band of 27 MHz centered on the i.f. of 134 MHz. The output of the SAW filter 40 is applied to a limiter and discriminator stage 41 in which the frequency modulated chrominance and luminance vision components of the i.f. signal are demodulated to produce at its output a baseband vision MAC signal which is subjected to de-emphasis in a de-emphasis stage 42. The limiter and discriminator stage 41 also produces the a.f.c. voltage which is applied over connection 38 to adder circuit 37.

Figure 9:
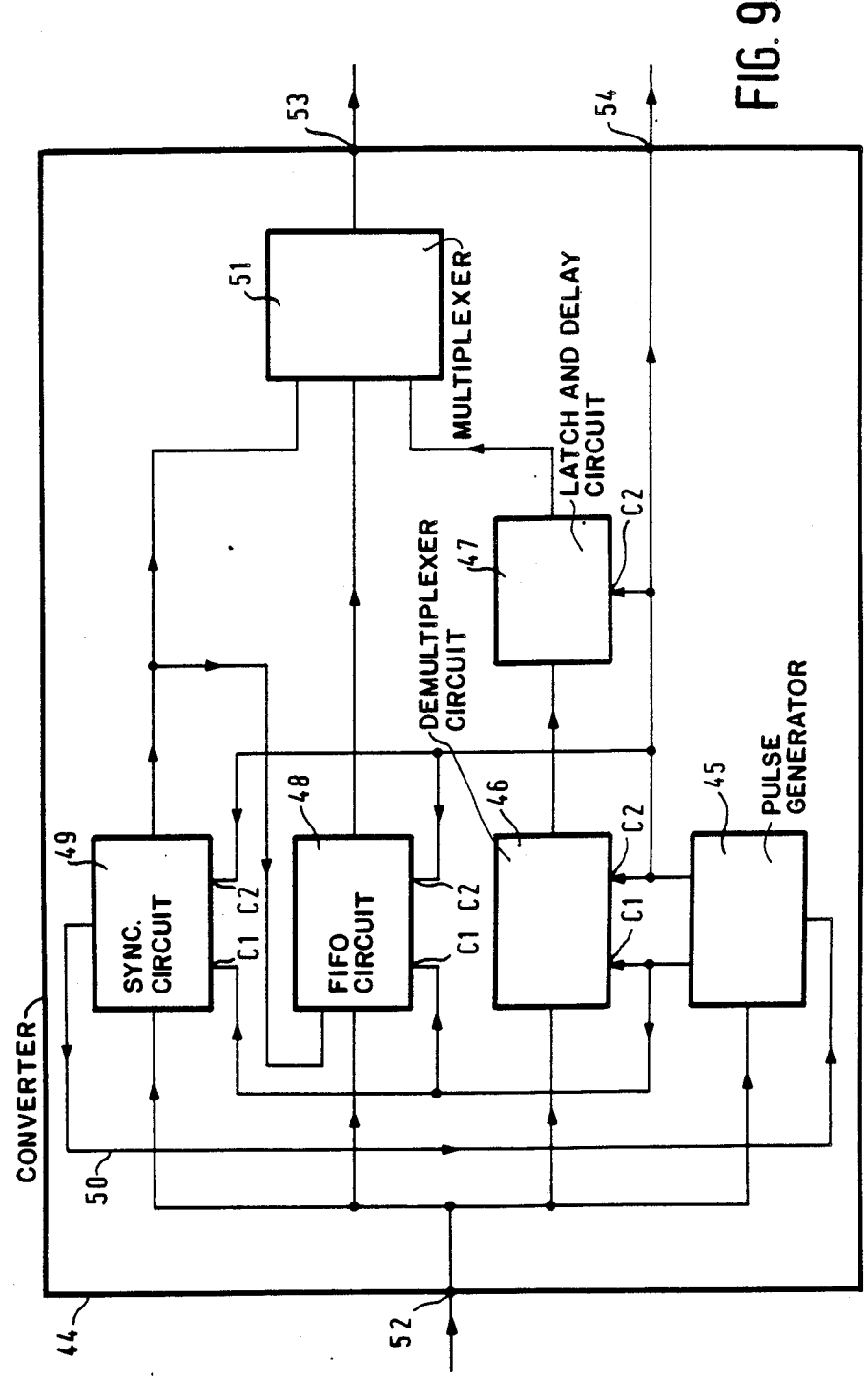
FIG. 9 is a block diagram of part of FIG. 8 in greater detail.

The i f. signal is also applied to a limiter and 2-4 PSK demodulator stage 43 in which the data burst (sound/data component) and the additional digital information all at 20.25 Mbit/s are recovered. These digital signals are applied to a converter 44 which has a number of functions, one of which is to expand the bits of the sound/data digital signals such that they have a much lower bit rate. Certain features of the converter unit 44 are shown in greater detail in FIG. 9. In FIG. 9 the digital information at 20.25 Mbit/s is applied to the input 52 of the converter 44 from where it is applied as an input to a pulse generator 45, which generator produces the various required clock frequencies together with the various write and read control signals that are also required for the correct operation of the converter 44. The input at 52 is also applied to a demultiplexer circuit 46 to receive the 196 sound/data bits per line at the clock rate C1 of 20.25 MHz which under the control of a second clock signal C2 of 10.125 MHz produces at its output alternate pulses from the input data i.e. only 'A' bits or only 'B' bits as related to FIG. 6. The output of the demultiplexer circuit 46 containing, say, only 'A' bits is applied to a latch and delay circuit 47 where the length of each bit is doubled and subjected to a short delay as will be described below, the circuit 47 also receiving C2 clock pulses at 10.125 MHz.

The data at terminal 52 is also applied to a first-in-first-out circuit (FIFO) 48, designated the L624/625 FIFO, which operates on the active data in line 624 and 625 of each frame to make a part of this data suitable for transmission at the lower bit rate of 10.125 Mbits/s, this FIFO also receiving C1 and C2 clock pulses at their respective frequencies. Terminal 52 is also connected to a sync circuit 49 which under the control of clock frequencies C1 and C2, extracts the synchronizing information from the received line sync words, and knowing the predetermined sequence of such sync words produces the appropriate sync word for each line at the 125 Mbits per second rate at the desired time as will be explained hereinafter with reference to FIG. 10. The sync circuit 49 also produces a timing control signal from the incoming sync words which is applied over a connection 50 to a further input of the pulse generator 45 to accurately control the appearance of the write and read signals produced by the pulse generator.

Figure 10:
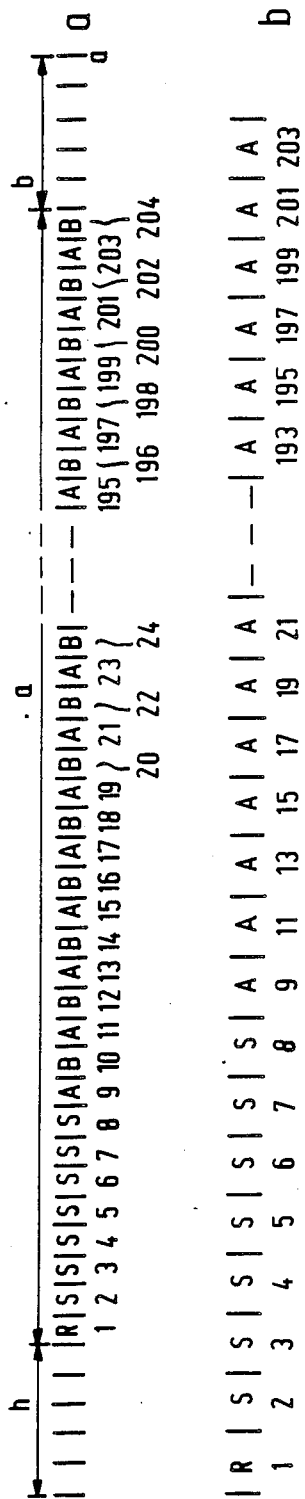
FIG. 10 is a timing diagram for explaining the operation of part of FIG. 9.

The outputs of the latch and delay circuit 47, the L624/625 FIFO 48 and the sync circuit 49 are all connected to respective inputs of a multiplexer 51 which under the control of a control signal (not shown) from the pulse generator 45 to produce the data burst and line 625 data at half the C-MAC Packet bit rate, namely at 10.125 Mbits/s at an output 53. How this is achieved with respect to the data in those lines conveying data from the 'A' and 'B' multiplexes will be explained in relation to the timing diagrams shown in FIG. 10. FIG. 10a shows in detail a portion from adjacent lines containing the 5 sample periods of the transition into data—(h), the 204 bits of synchronization and sound/data (data burst)—(a) and the 5 sample periods of the transition from the end of data—(b), all these being at the 20.25 Mbits per second rate having been previously referred to in relation to FIG. 1. The 204 bit periods of the synchronization and sound/data are numbered consecutively and it will be seen that the bit depicted as R is the run-in for synchronization while bits 2 to 8 inclusive (S) form the 7 bits of the appropriate line sync word. The remaining bits 9 to 204 carry the sound/data with the odd numbered bits carrying data from group 'A' while the even numbered bits carry data from group 'B'. For certain types of modulation the periods (h) and (b) will not be required as transitions and can thus be utilized to carry data in a converted signal and thus if the bit rate is halved the number of bits can be increased from a/2=204/2=102 to (h+a+b)/2=214/2=107. It will not be necessary to transmit the run-in bit R for the sync word making it possible to utilize 98 bits for the active data. Transmission of the data may now start from the beginning of the period (h) but as will be seen from FIG. 10a the sync word for the line under consideration starts after the period (h). This can be overcome by using the line sync words produced by the sync circuit 49 as described above with a run-in bit and positioned as shown in FIG. 10b. In FIG. 10b the numbered bits are those which the correspond to the bits in the data burst of FIG. 10a. The latch and delay circuit 47 latches or expands each 'A' bit from the demultiplexer 46 and produces an expanded train of the 'A' bits at the 10.125 Mbits per second rate delayed by one bit period at this rate. The first expanded 'A' bit therefore follows the seventh expanded bit of the sync word, this 'A' bit being numbered A9 to show from which bit of the incoming data it is derived, this applying to the other 'A' bits. The last 'A' bits of this data (A201 and A203) extend into the transition period (b) with half an expanded bit period to spare and thus it will be seen that the line sync word and 'A' bits of the data can readily be accommodated in the periods (h), (a) and (b).

The L624/625 FIFO 48 in addition to receiving the data at terminal 52 also receives the output S from the sync circuit 49. This FIFO takes the appropriate expanded line sync word to be used with lines 624 and 625 and position them at the start of the expanded lines 624 and 625 which again will commence at the beginning of the period (h). The data from these lines is not dealt with as the previous lines but is simply read on a first-in-first-out basis at the expanded rate. This means that it will not be possible to include all the possible data that could appear in lines 624 and 625 in expanded form. With the proposed modifications to lines 624 and 625 as previously described this is not a disadvantage, as portions of these lines have no active data allocated to them. The removal of the static data frame (SDF) to the active data area of line 624 allows the frame synchronizing data (FSD), unified date and time (UDT), and repeated data frame (RDF) to be accomodated when expanded within a line period.

In addition to the above data being produced at the output 53 of the converter 44, a further output 54 supplies clock pulses at 10.125 MHz.

Referring again to FIG. 8, the vision signal from the de-emphasis stage 42 is applied to the modulation input of a modulator 55 in which this signal is amplitude modulated onto a carrier received at a second input from a carrier oscillator 56, the frequency of the carrier being in the frequency bands used for cable distribution systems. The output from the modulator 55 is applied to a first input of a multiplexer 57 whose output is applied through a vestigial sideband filter 58 to an output 59 of the conversion unit for application to a cable distribution system.

The outputs at terminals 53 and 54 of the converter respectively conveying the expanded digital signals and the associated clocking frequency (10.125 MHz) are applied to a digital modulator 60 which at a further input receives the carrier from the carrier oscillator 56 and in which this carrier is digitally modulated by the expanded digital signals which may have been converted to duo-binary form. The modulated output from modulator 60 is applied to a second input of the multiplexer for application to the output terminal 59 by way of the filter 58.

Reception of the data signals of the present transmission system for a receiver connected to a cable conveying only the 'A' group data will not differ greatly to that proposed for C-MAC Packet receivers, save that the data will be at half bit rate. A receiver for reception of the data signals directly from a satellite will require a demultiplexer which will reconstruct the data into its two separate groups, A and B. This will have the advantage that operation on the data to recover its signals will be at a lower bit rate (10.125 MHz instead of 20.25 MHz) which will make handling of the data easier. A dual standard receiver for cable/satellite operation can readily be obtained by a combination of the above with the two necessary data demodulators and a suitable switching arrangement between the demultiplexed data from the satellite and that obtained from the cable.

I claim:

1. A television transmission system having a time multiplexed signal in component form the majority of the lines of a frame period of which contain a digital data burst component and a vision component, the data in the data burst component, which is derived from a plurality of sources, being time multiplexed as a series of blocks from each source in the data burst which has a given data rate, characterized in that said sources are divided into a number of groups and the data from the sources for each group is time multiplexed as a series of blocks of bits from each source in a data bit stream to form a corresponding number of sub-multiplexes, the data bits forming each of the relevant lines of the data burst being derived from each of the said number of data bit streams at the said given data bit rate with the number of bits in a data burst corresponding to an integral multiple of the said number of groups.

2. A television transmission system as claimed in claim 1, characterised in that said sources are divided into two groups. successive lines of each data burst always starting with a bit from a first of said two groups.

3. Television transmitter equipment for use with the television transmission system as claimed in claim 1 or 2, comprising a source of vision signals to form a time multiplexed vision signal, a plurality of sources of sound/data signals, means for processing the sound-/data signals as digital signals and for time multiplexing the digital signals as a series of blocks located in the data burst component of said television signal at a given data rate, characterized in that said sources of sound/data signals are divided into a number of groups, means for time multiplexing the signals from the sources of each group as a series of blocks of bits in a data bit stream to form a corresponding number of sub-multiplexes, means for selecting the bits from each of the said number of bit streams and for assembling said bits into said data burst such that the relevant lines of the data burst contain bits derived from each of the bit streams at the said given data rate while the number of bits in a data burst corresponding to an integral multiple of the said number of groups.

4. Television transmitter equipment as claimed in claim 3, characterized in that said sources of sound/data signals are divided into two groups, said selecting means selecting the bits from each goup such that successive lines of each data burst start with a bit from a first of said two groups.

5. Television receiving equipment for use with the television transmission system as claimed in claim 1 or 2, comprising means for receiving said television signal, means for separating said vision components from said television signal, means for producing the data burst from said television signal, characterized in that said receiving equipment additionally comprises means for selecting the bits from the data burst representing a particular one of said groups.

6. Television receiving equipment as claimed in claim 4, comprising means for re-modulating said vision components on a carrier with a bandwidth less than that of said received signal, characterized in that means are further provided for forming said bits from said one of said groups into a reformed data burst with a reduced data rate corresponding to the said given bit rate divided by the said number of sub-multiplexes, and means for modulating the data burst so formed onto said carrier to form a further time multiplexed television signal comprising said bandwidth restricted vision components and the reformed data burst.

* * * * *